(12) United States Patent
Park

(10) Patent No.: US 6,195,673 B1
(45) Date of Patent: Feb. 27, 2001

(54) FOD (FIRST-ONE-DETECTOR) CIRCUIT

(75) Inventor: Sung-Soo Park, Seoul (KR)

(73) Assignee: LG Semicon Co., Ltd., Choongcheongbuk-Do (KR)

( * ) Notice: Subject to any disclaimer, the term of this patent is extended or adjusted under 35 U.S.C. 154(b) by 0 days.

(21) Appl. No.: 09/154,098

(22) Filed: Sep. 16, 1998

(30) Foreign Application Priority Data

Jan. 23, 1998 (KR) .................................................. 98-2013

(51) Int. Cl.[7] ...................................................... G06F 7/00
(52) U.S. Cl. ............................................................. 708/211
(58) Field of Search ................................. 708/211, 205, 708/505

(56) References Cited

U.S. PATENT DOCUMENTS

| | | | |
|---|---|---|---|
| 4,785,421 | * 11/1988 | Takahashi et al. | 708/211 |
| 4,926,369 | * 5/1990 | Hokenek et al. | 708/211 |
| 5,091,874 | * 2/1992 | Watanabe et al. | 708/211 |
| 5,317,527 | 5/1994 | Britton et al. | 364/715.04 |
| 5,345,405 | * 9/1994 | Walsh et al. | 708/211 |
| 5,493,520 | * 2/1996 | Schmookler et al. | 708/211 |
| 5,504,697 | * 4/1996 | Ishida | 708/211 |
| 5,511,222 | * 4/1996 | Shiba et al. | 708/211 |
| 5,568,410 | * 10/1996 | Béchade | 708/211 |

* cited by examiner

*Primary Examiner*—Tan V. Mai
(74) *Attorney, Agent, or Firm*—Morgan, Lewis & Bockius LLP

(57) ABSTRACT

A FOD (First-One-Detector) circuit for detecting the number of leading zeros counted from a most significant bit to a first one in a binary number includes a plurality of sub-FODs respectively having a plurality of unit blocks connected in cascade, when a fraction input is less than 16 bits, depending on the number of bits and respectively provided with a plurality of transmission transistors. When the fraction input is more than 16 bits, the plurality of sub-FODs respectively output the number of leading zeros with regard to predetermined bits of fraction inputs, and a determinative signal for determining whether the fraction inputs are all zeros. The sub-FODs respectively further include an encoding circuit for encoding the number of leading zeros outputted from the plurality of sub-FODs and the determinative signal and outputting the resultant number of leading zeros. The FOD circuit employs a fewer number of transistors and realizes a faster normalization by a quick detection of leading zeros.

15 Claims, 3 Drawing Sheets

US 6,195,673 B1

FOD (FIRST-ONE-DETECTOR) CIRCUIT

BACKGROUND OF THE INVENTION

1. Field of the Invention

The present invention relates to a circuit for a first-one-detector (hereinafter, "FOD") which detects the number of leading zeros (0s) from a most significant bit to a first one. (1) in a binary number, which is capable of optimizing its speed and chip area.

2. Description of the Background Art

In general, a binary number may be expressed by a combination of an exponent and a fraction (mantissa). Assuming that an exponent is $2^n$ (n=0, 1, 2 . . . ) and its fraction is "A" (for example, 0.00000 . . . 1), the binary value ($2^n*A$) may be expressed in many ways. For example, $2^{-3}*0.101101$ . . . , may be substituted by $2^{-4}*0.0101101$ . . . , or $2^{-5}*0.00101101$ . . .

A normalization is regarded as essential in designing a floating point unit for a microprocessor. Such a normalization places "1" at a first bit location after a fraction point in a binary number. In other words, the normalized binary value is expressed as $2^{-3}*0.101101$ . . . , instead of as $2^{-4}*0.0101101$ . . . , $2^{-5}*0.00101101$ . . . , or the like.

Therefore, in order to normalize an exponential expression such as $2^{-5}*0.00101101$ . . . , the number of leading zeroes counted from a fraction point to a first one should be recognized to compensate for the exponential expression, and then the leading zeros in $2^{-5}*0.00101101$ . . . , that is, the number of zeros (two) after the fraction point until the first one appears, are initially obtained.

Then, the exponent value "−5" of $2^{-5}$ is added to the obtained value "2" denoting the number of leading zeros, to thereby produce "$2^{-3}$", so that the fraction point is shifted by two bits to the right for thereby obtaining a normalized fractional value of "0.101101 . . . ".

A FOD (or leading zero detector) is employed to recognize the number of leading zeroes counted until a first one occurs, and an adder and a shifter are used to execute its adding operation and shifting operation.

When the number of bits are increased during the design of a floating point unit, the FOD circuit has a crucial role on the speed of normalization.

Specifically, when applied to 16 bits, a leading zero detection does not seriously affect the normalization, since the number of zero bits appearing from after the fraction point till the first one are not so many. However, when applied to 64 bits, the speed of normalization depends on how fast the number of leading zeros from after the fraction point to a first one bit are detected.

Due to its recursive characteristic, FOD may be expressed in Boolean terms as follows:

$Z[0]=I[4]$ $Z[1]=/I[4]*I[3]$ $Z[2]=/I[4]*/I[3]*I[2]$ $Z[3]=/I[4]*/I[3]*/I[2]*I[1]$ $Z[4]=/I[4]*/I[3]*/I[2]*/I[1]*I[0]$   Eq. (1)

wherein, I[0]~I[4] denote a 5-bit binary number, and Z[0]~Z[4] denote that the number of zeros counted from the MSB is 0, 1, 2, 3 and 4, respectively.

Using the recursive characteristic of equation 1, the conventional FOD realizes a cascade circuit structure as shown in FIG. 1, and the encoding circuit 10 integrates respective numbers of zeros Z[0], . . . , Z[4] which appear from the MSB.

Initially, when I[4] is "1", Z[0] becomes "1", and the others, Z[1], . . . , Z[4], become zero, respectively, so that output values N[2], N[1], N[0] of the encoding circuit 10, that is, the binary number N[2:0] become "0", whereby the leading zero number becomes "0".

Also, when I[4] and I[3] are "0" and I[2] is "1", Z[0], Z[1], Z[3], Z[4] respectively become "0" and Z[2] becomes "1", so that a binary number of "010" satisfying N[2]=0, N[1]=1 N[0]=0 is outputted, thereby indicating the existence of two (2) leading zeros.

In addition, when I[4], I[3], I[2], I[1] are respectively "0" and I[0] is "1", Z[0], Z[1], Z[2], Z[3] respectively become "0" and Z[4] becomes "1", so that a binary number of "100" is outputted from the encoding circuit 10, thereby indicating the existence of four (4) leading zeros.

However, when a "0" value is transited from I[4] serving as the MSB to I[0] serving as the LSB, the "0" signal flows along AND gates AD11~AD13 including inverters I11~I14 and a plurality of transistors, so that the more the input bit number, the longer becomes the propagation delay time of the "0" signal by the AND gates AD11~AD13.

Further, the AND gates AD11~AD13 are made up of a plurality of transistors, which disadvantageously increases the entire FOD chip layout area.

SUMMARY OF THE INVENTION

Accordingly, it is an object of the present invention to provide an FOD circuit enabling a fast detection of leading zeros when the input bits are increased during a fraction input, using a fewer number of transmission transistors.

To achieve the above-described object, there is provided an FOD (First-One-Detector) circuit detecting the number of leading zeros counted from a most significant bit to a first one ("1") bit in a binary number, wherein the FOD circuit includes a plurality of unit blocks connected in cascade depending on the number of bits and respectively provided with a plurality of transmission transistors. The unit blocks according to the present invention respectively include a first transmission transistor for transmitting a fraction input in accordance with a control signal outputted in response to a previous bit, an inverter for inverting the fraction input and outputting a control signal with regard to a corresponding transmission transistor for a subsequent bit, a second transmission transistor for fixing an output signal of the first transmission transistor to a high level in accordance with the control signal outputted in response to the previous bit, and an logic gate for ANDing the fraction input and the control signal outputted in response to the previous bit and outputting the number of leading zeros counted from the most significant bit.

Further, to achieve the above-described object, there is provided an FOD circuit according to the present invention which includes a plurality of sub-FODs for respectively outputting corresponding numbers of leading zeros with regard to predetermined bits of fraction inputs from a previous bit stage when the number of fraction input bits surpasses 16 bits, and an encoding circuit for encoding the number of leading zeros outputted from the plurality of sub-FODs and the determinative signal and outputting the resultant number of 5-bit leading zeros.

The object and advantages of the present invention will become more readily apparent from the detailed description given hereinafter. However, it should be understood that the detailed description and specific example, while indicating a preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become better understood with reference to the accompanying drawings which are given only by way of illustration and thus are not limitative of the present invention, wherein.

DETAILED DESCRIPTION OF THE PREFERRED EMBODIMENTS

Figure 1:
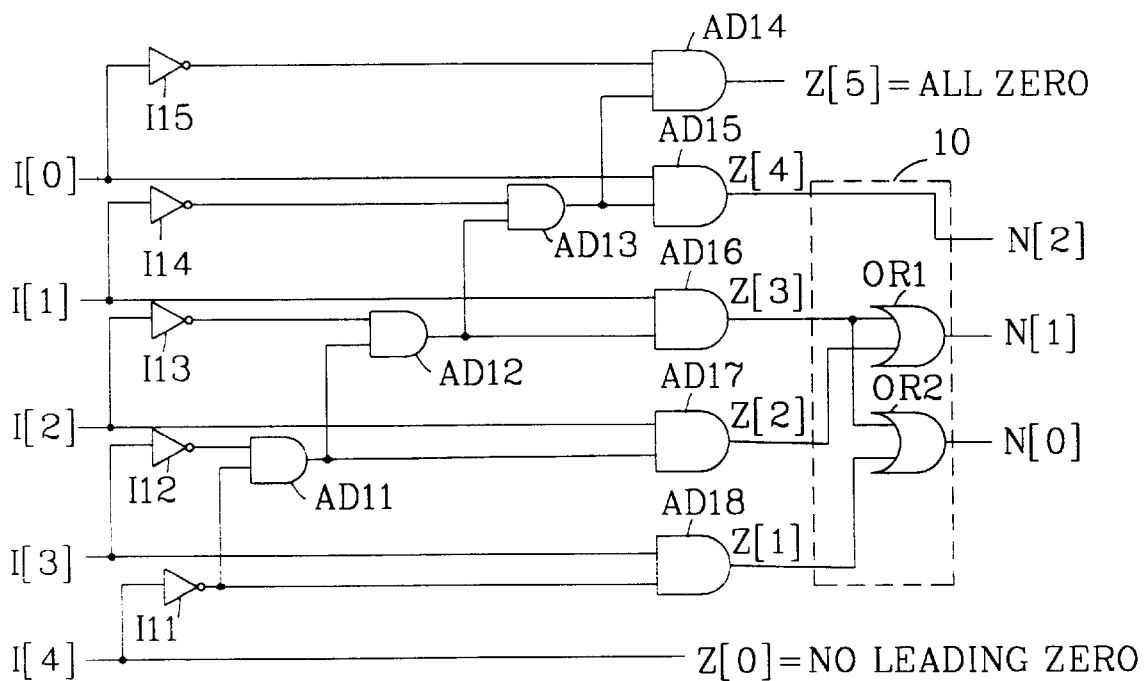
FIG. 1 is a view illustrating a conventional cascade type FOD circuit.
Figure 2:
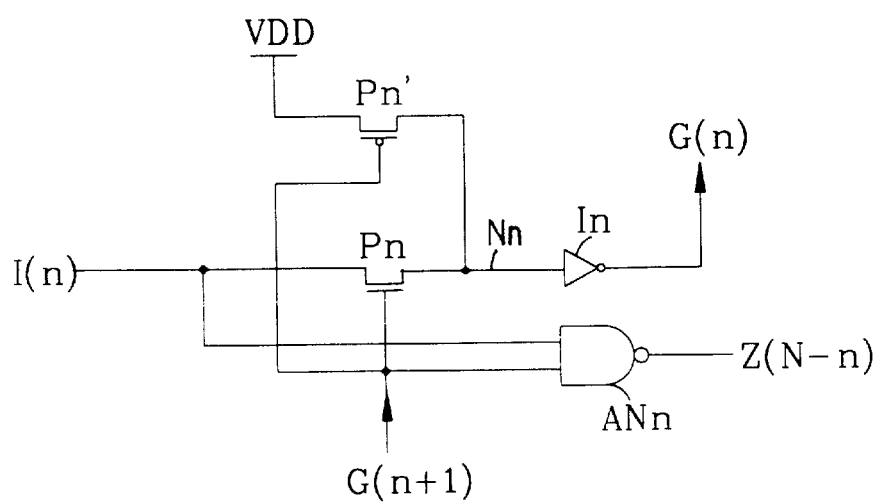
FIG. 2 is a view illustrating a unit block of the FOD circuit according to the present invention.

As shown in FIG. 2, the FOD circuit according to the present invention is realized by connecting unit blocks in cascade in accordance with the number of bits.

Each unit block includes a transmission transistor Pn transferring a fraction input I[n] in accordance with a control signal G(n+1) output in response to a previous most significant bit, another transistor Pn' fixing the voltage at node n1 to its high level in accordance with a control signal G(n+1) when the transmission transistor Pn is turned off, an inverter In inverting the voltage at the node n1 to control the subsequent bit of transistor Pn–1, and an AND gate ANn ANDing the fraction input I[n] and the control signal G(n+1) and outputting the number Z[N−1−n] of leading zeros which appear from the MSB. At this time, N denotes an entire bit number of the fraction input I[n], so that the bit sum of the fraction input I[n] in FIG. 3 is five, thereby satisfying N=5.

Figure 3:
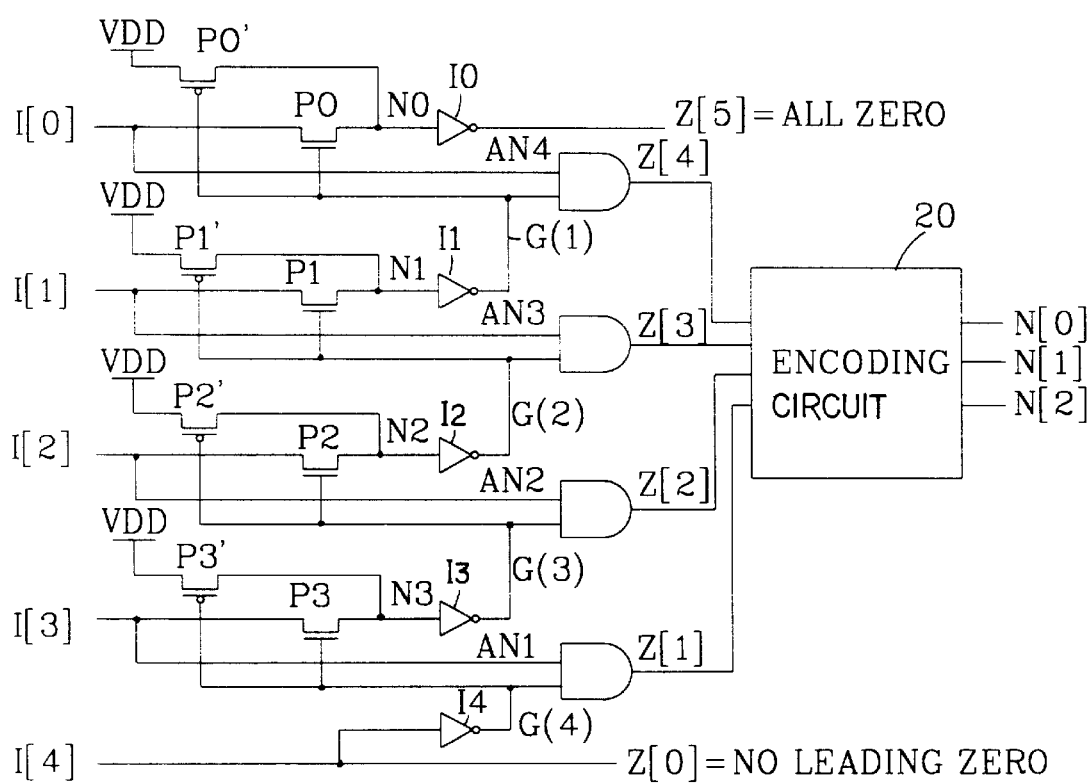
FIG. 3 is a view illustrating a 5-bit FOD circuit realized using the unit block in the circuit of FIG. 2, according to a first embodiment of the present invention.

FIG. 3 illustrates the first embodiment of a 5-bit FOD using the unit block in the circuit of FIG. 2 according to the present invention. As shown therein, a plurality of unit blocks are connected to each other in cascade, and the number Z[n] of leading zeros generated in the unit block is integrated into an encoding circuit 20.

The operation of the FOD circuit according to the present invention will now be described.

As shown in FIG. 3, the 5-bit FOD receives fraction inputs I[4], I[3], I[2], I[1], I[0] and allows I[4] serving as the MSB to output Z[0], Z[1], Z[2], Z[3], Z[4], Z[5], and the encoding circuit 20 encodes the numbers Z[1], Z[2], Z[3], Z[4] of leading zeros, thereby outputting a 3-bit value N[2:0], that is, N[0], N[1], N[2].

Respective input levels of the fraction unit I[4], I[3], I[2], I[1], I[0] are provided as examples for the following description.

1. When the Faction Input I[4] is "1"

In case the fraction input I[4] is "1", Z[0] without leading zeros becomes "1", and the control signal G(4) becomes "0" in accordance with the fraction input I[4] inverted in the inverter I4. The transmission transistor P3 is turned off by the control signal G(4), and the transmission transistor P3' becomes turned on. Also, when the transmission transistor P3' is turned on, its source voltage Vdd is inverted by the inverter I3 and the control signal G(3) becomes "0", so that the transmission transistor P2 is turned off and the transmission transistor P2' is turned on.

Using a method identical to the above, the control signals G(2), G(1) respectively become "0", and the transmission transistors P1, P0 are turned off and the transmission transistor P1', P0' are turned on in accordance with the control signals G(2), G(1).

At this time, the transmission transistors P3~P0' serve to fix the voltages to high levels at nodes n3~n0 serving as output terminals of the transmission transistors P3~P0. Here, if the voltage at node n3 is at a high level, the respective output values of all the transmission transistors P3~P0 are set at high levels.

Therefore, the numbers Z[1]~Z[4] of leading zeros respectively become "0", whereby the 3-bit value N[2:0] output from the encoding circuit 20 becomes "000".

2. When the Fraction Inputs I[4], I[3] are "0" and the Fraction Input I[2] is "000"

The transmission transistors P3, P2 are turned on and the transmission transistors P3', P2' are turned off, in accordance with the high level control signals G(4), G(3). The transmission transistors P1, P0 are turned off and the transmission transistors P1', P0' are turned on, in accordance with the low level control signals G(2), G(1).

Therefore, I[4] is "1" and I[3], I[4] are respectively "0", so that only Z[2] output from the AND gate AN2 becomes "1", and Z[0], Z[1], Z[3], Z[4] outputted from the other AND gates AN1, AN3, AN4 are turned to "0", whereby the encoding circuit 20 outputs N[0], N[1], N[2], that is, a binary number (N[2:0]="010"), thereby indicating that the number of leading zeros is two.

3. When the Fraction Inputs I[4], I[3], I[2], I[1] are "0" and I[0] is "1"

The transmission transistors P3, P2, P1, P0 are turned on in accordance with the high level control signals G(4), G(3), G(2), G(1), so that only Z[4] outputted from the AND gate AN4 becomes "1" and the other values Z[0]~Z[3] and Z[5] respectively become "0". As a result, the encoding circuit 20 outputs a binary number N[2:0]=100, thereby indicating that the number of leading zeros is four.

4. When the Fraction inputs I[4]~I[0] are respectively "0"

When the fraction inputs I[4]~I[0] are all zeros, Z[0]~Z[4] all become "0" and Z[5] becomes "1" which means that all of the fractions are "0", thereby satisfying N[2:0]="000". Also, the time until the transmission transistor P0 is turned on denotes the time period delayed by the inverters I4~I1 and the transmission transistors P3~P1.

Consequently, in the FOD circuit according to the present invention, only the inverters I4~I1 and the transmission transistors P3~P1 cause the time delay, when compared to the conventional art, so that the leading zeros at the upper (more significant) bits are quickly detected and its value is quickly transferred to the lower bits, thereby making it possible to realize a fast detection of the leading zeros. Further, a fewer number of transistors than those of the conventional art can realize the FOD circuit according to the present invention, thereby decreasing its chip layout area.

The FOD circuit illustrated in FIG. 3 is effective when the number of fraction bits are less than 16. Therefore, when the number of bits is increased beyond 16, a plurality of bits of the input is divided into several sub-blocks in correspondence with a propagation effect of leading zero detection.

Figure 4:
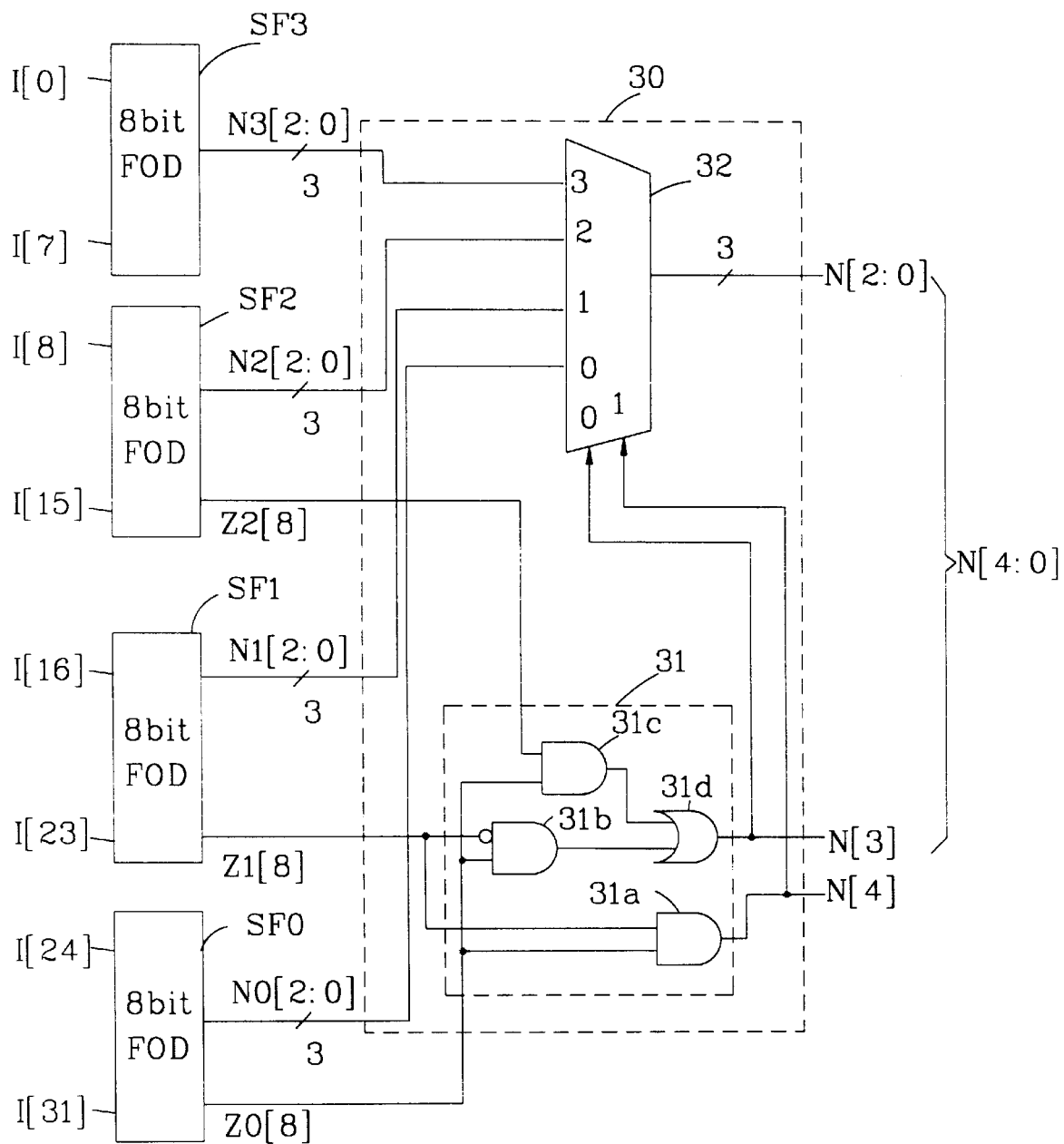
FIG. 4 is a circuit view illustrating a 32-bit FOD circuit realized using four 8-bit sub-FODs, according to a second embodiment of the present invention.

FIG. 4 illustrates the second embodiment of the present invention, wherein a 32-bit fraction input is realized in four 8-bit FODs (SF0~SF3), and an encoding circuit 30 including a logic operational unit 31 and a multiplexer 32 integrates the respective outputs of the sub-FODs (SF0~SF3).

The logic operational unit 31 includes an AND gate 31a ANDing an output value Z0 [8] of the sub-FOD(SF0) and an output value Z1 [8] of the sub-FOD(SF1) and outputting a leading zero value N[4], another AND gate 31b ANDing the output value Z0 [8] of the sub-FOD(SF0) and the inverted output value /Z1 [8] of the sub-FOD(SF1), another AND gate 31c ANDing the output value Z0 [8] of the sub-FOD (SF0) and the inverted output value Z2 [8] of the sub-FOD (SF2, and an OR gate 31d ORing the respective output values of the AND gate 31b and the AND gate 31c for thereby outputting a leading zero value N[3].

The multiplexer 32 selectively outputs leading zero numbers N0 [2:0], N1 [2:0], N2 [2:0], N3 [2:0] which are outputted from the sub-FODs(SF0~SF3).

At this time, the number of leading zeros outputted from the sub-FOD(SF0) serving as the MSB is defined as N0 [2:0], and in an identical manner, the number of leading zeros respectively outputted from the sub-FODs(SF1, SF2, SF3) serving as MSBs are defined as N1 [2:0], N2 [2:0], N3 [2:0]. The value Z0(8), which becomes "b 1" when the fraction inputs I[24]~I[31] of the sub-FOD (SF0) are all zeros, denotes a determinative signal. Likewise, with regard to the sub-FODs (SF1, SF2), Z1 [8] and Z2 [8] are respectively outputted.

At this time, the leading zero values N[4] and N[3] may be expressed as follows depending on a device constitution of the logic operational unit 31:

$$N[4]=Z0[8]*Z1[8],$$

$$N[3]=(Z0[8]*/Z1[8])+(Z0[8]*Z2[8]).$$

The relation between determinative signals Z0[8], Z1[8], Z2[8] and the leading zero values N[4], N[3] is as follows:

| Z0[8] | Z1[8] | Z2[8] | N[4] | N[3] |
|-------|-------|-------|------|------|
| 0 | x | x | 0 | 0 |
| 1 | 0 | x | 0 | 1 |
| 1 | 1 | 0 | 1 | 0 |
| 1 | 1 | 1 | 1 | 1 |

Therefore, the multiplexer 32 of the encoding circuit 30 selectively outputs 3-bit leading zero numbers N0 [2:0], N1 [2:0], N2 [2:0], N3 [2:0] in accordance with the leading zero values N[4], N[3] which are outputted from the logic circuit unit 31.

For example, let the value Z0 [8] be "1", which means that the fraction inputs I[24]~I[31] of the sub-FOD(SF0) are all turned to "0". Therefore, the leading zero values N[4], N[3] respectively become "0" and the multiplexer 32 selectively outputs N0[2:0] which is outputted from the sub-FOD(SF0), in accordance with the leading zero value "00".

When Z0 [8] is "1" and Z1 [8] is "0", the respective fraction inputs I[24]~I[31] of the sub-FOD(SF0) are all turned to "0", but the respective fraction inputs I[16]~I[23] of the sub-FOD(SF1) are not turned to "0". As a result, the leading zero values N[4], N[3] respectively become "0" and "1", so that the multiplexer 32 outputs N1[2:1] which is outputted from the sub-FOD(SF1), in accordance with the leading zero value "01".

In the same manner as described above, when Z0 [8], Z1 [8], Z2 [8] are all "1", the fraction inputs of the sub-FODs (SF0~SF2) are all "0". Therefore, the leading zero values N[4], N[3] respectively become "1" and "1", and the multiplexer 32 selectively outputs N3[2:0] which is outputted from the sub-FOD(SF3), in accordance with the leading zero value "11".

Then, from the 3-bit value N[2:0] and 2-bit value N[4], N[3], a 5-bit value N[4:0] is generated, thereby realizing a FOD capable of sensing 32 zeros in all.

Consequently, when the 32-bit fraction inputs are divided into four 8-bit FODs, a delay transfer of a "0" signal does not surpass 8 bits at the most, thereby realizing a fast FOD using a fewer number of transistors.

As described above, the FOD circuit according to the present invention is provided with a plurality of bits of fraction inputs and is realized using a fewer number of transistors, thereby enabling a faster normalization by a quick detection of leading zeros.

As the present invention may be embodied in several forms without departing from the spirit of essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within meets and bounds of the claims, or equivalences of such meets and bounds are therefore intended to embrace the appended claims.

What is claimed is:

1. A FOD (First-One-Detector) circuit for detecting the number of leading zeros counted from a most significant bit to a first one ("1") in a binary number input, wherein the FOD circuit includes a plurality of unit blocks connected in cascade depending on the number of fraction input bits and each respectively provided with a plurality of transmission transistors, each said unit block, comprising:

a first transmission transistor for transmitting a fraction input in accordance with a control signal outputted in accordance with a previous bit;

an inverter for inverting the fraction input bit and outputting a control signal with regard to a corresponding transmission transistor for a subsequent input bit;

a second transmission transistor for fixing an output signal of the first transmission transistor to a high level in accordance with the control signal outputted in accordance with the previous input bit; and a logic gate for ANDing the fraction input bit and the control signal outputted in accordance with the previous input bit and outputting the number of leading zeros counted from the most significant bit of the fraction input.

2. The FOD circuit according to claim 1, wherein the first and second transmission transistors are MOS type transistors of respectively different types from each other.

3. The FOD circuit according to claim 1, wherein the first transmission transistor is an NMOS transistor, and the second transmission transistor is a PMOS transistor.

4. The FOD circuit according to claim 1, wherein a signal indicating that the previous input bit is a zero passes through only the first transmission transistor and the inverter.

5. An FOD (first-one-detector) circuit, comprising:

first to nth sub-FODs (sub-first-one-detectors), wherein each of the first to nth sub-FODs receives a predetermined number of bits of a fraction input counted from a most significant bit and outputs a number of leading zeros with regard to the received bits of the fraction input, and wherein each of the first to (n−1)th sub-FODs activates a determinative signal when the received bits of the fraction input are all zeros; and an encoding circuit for receiving and encoding the number of leading zeros outputted from the each of the first to nth sub-FODs and the determinative signals, and outputting a number of leading zeros with regard to the number of bits of the fraction input.

6. The FOD circuit according to claim 5, wherein the each of the first to nth sub-FODs comprises a plurality of unit blocks, according to the number of the received bits of the fraction input, connected to each other in cascade, wherein each of the plurality of unit blocks includes a plurality of transmission transistors.

7. The FOD circuit according to claim 6, wherein the each of the unit blocks comprises:

a first transmission transistor for transmitting the fraction input in accordance with a control signal outputted in accordance with a previous input bit;

an inverter for inverting the fraction input bit and outputting a control signal with regard to a corresponding transmission transistor for a subsequent input bit;

a second transmission transistor for fixing an output signal of the first transmission transistor to a high level in accordance with the control signal outputted in accordance with the previous input bit; and a logic gate for ANDing the fraction input bit and the control signal outputted in accordance with the previous input bit and outputting the number of leading zeros counted from the most significant bit.

8. The FOD circuit according to claim 7, wherein the first and second transmission transistors are MOS type transistors of different types from each other.

9. The FOD circuit according to claim 8, wherein the first transmission transistor is an NMOS transistor, and the second transmission transistor is a PMOS transistor.

10. The FOD circuit according to claim 5, wherein the nth sub-FOD outputs the number of leading zeros but does not output a determinative signal.

11. The FOD circuit according to claim 5, wherein the encoding circuit comprises:

a logic operational unit for logically combining respective determinative signals outputted in accordance with the first to (n−1)th sub-FODs and outputting a 2-bit leading zero value; and a multiplexer for selectively outputting a predetermined number of bits of leading zero values which are outputted from the first to nth sub-FODs, in accordance with the leading zero value outputted from the logic operational unit.

12. An FOD (first-one-detector) circuit, comprising;

first to fourth sub-FODs (sub-first-one-detector), wherein each of the first to fourth sub-FODs outputs a number of leading zeros and each of the first to third sub-FODs outputs a determinative signal with regard to each of 8 bits of a fraction input counted from a most significant bit when the fraction input with 32-bits is applied thereto; and an encoding circuit for encoding the number of leading zeros and the determinative signals outputted from the each of the first to fourth sub-FODs and outputting a number of leading zeros with regard to the fraction input of 32-bits.

13. The FOD circuit according to claim 12, wherein the fourth sub-FOD outputs the number of leading zeros with regard to the 8-bit fraction inputs but does not output a determinative signal.

14. The FOD circuit according to claim 12, wherein the encoding circuit comprises:

a logic operational unit for logically combining respective determinative signals outputted in accordance with the first to third sub-FODs and outputting a 2-bit leading zero value; and a multiplexer for selectively outputting 3-bit leading zero values which are outputted from the first to fourth sub-FODs in accordance with the leading zero value outputted from the logic operational unit.

15. The FOD circuit according to claim 14, wherein the logic operational unit comprises:

a first logic gate for ANDing respective determinative signals outputted in accordance with the first and second sub-FODs and outputting a leading zero value;

a second logic gate for ANDing the determinative signal outputted in accordance with the first sub-FOD and an inverted version of the determinative signal outputted in accordance with the second sub-FOD; and a third logic gate for ANDing the determinative signals outputted in accordance with the first and third sub-FODs; and a fourth logic gate for ORing output signals of the second and third AND gates and outputting a leading zero value.

* * * * *